United States Patent
Lu

(10) Patent No.: US 12,542,482 B2
(45) Date of Patent: Feb. 3, 2026

(54) METHOD FOR CONTROLLING MULTIPLE POWER SUPPLIES

(71) Applicant: AA Power Inc., Boston, MA (US)

(72) Inventor: Qun Lu, Lexington, MA (US)

(73) Assignee: AA Power, Inc., Boston, MA (US)

( * ) Notice: Subject to any disclaimer, the term of this patent is extended or adjusted under 35 U.S.C. 154(b) by 283 days.

(21) Appl. No.: 18/220,244

(22) Filed: Jul. 10, 2023

(65) Prior Publication Data

US 2024/0022166 A1 Jan. 18, 2024

Related U.S. Application Data

(60) Provisional application No. 63/368,267, filed on Jul. 13, 2022.

(51) Int. Cl.
*H02M 1/42* (2007.01)
*G06F 9/4401* (2018.01)
*H02J 3/04* (2006.01)
*H02M 1/00* (2007.01)
*H02M 3/335* (2006.01)

(52) U.S. Cl.
CPC ........ *H02M 1/4208* (2013.01); *G06F 9/4403* (2013.01); *H02J 3/04* (2013.01); *H02M 1/0058* (2021.05); *H02M 3/33576* (2013.01)

(58) Field of Classification Search
CPC ...... H02M 1/4208; H02M 1/007; H02M 1/36; H02M 1/4225; H02M 1/0058
See application file for complete search history.

(56) References Cited

U.S. PATENT DOCUMENTS

| 6,771,052 | B2 * | 8/2004 | Ostojic | H02J 1/08 323/283 |
| 7,518,263 | B2 * | 4/2009 | Gan | H02M 3/33561 323/267 |
| 8,536,735 | B2 * | 9/2013 | Yan | H02M 3/3376 307/77 |
| 8,581,565 | B2 * | 11/2013 | Tang | H02M 3/33576 323/283 |

(Continued)

FOREIGN PATENT DOCUMENTS

| CN | 107482923 A | * 12/2017 | ........ H02M 3/33523 |
| CN | 108377102 A | * 8/2018 | .......... H02M 1/4233 |

(Continued)

OTHER PUBLICATIONS

Machine Translation CN-108377102-A (Year: 2018).*

(Continued)

*Primary Examiner* — Thienvu V Tran
*Assistant Examiner* — Yahveh Comas Torres
(74) *Attorney, Agent, or Firm* — AP3 Law Firm PLLC

(57) ABSTRACT

A method for controlling multiple power supplies includes configuring a plurality of power supplies to provide power to respective loads coupled to the plurality of power supplies, wherein inputs of the plurality of power supplies are coupled to an input voltage bus, and during a startup process, coordinating the plurality of power supplies such that the plurality of power supplies is powered up in a controllable manner, wherein as a result of coordinating the plurality of power supplies, a surge current flowing through the input voltage bus is reduced.

13 Claims, 16 Drawing Sheets

(56) References Cited

U.S. PATENT DOCUMENTS

| | | | | |
|---|---|---|---|---|
| 8,687,382 | B2* | 4/2014 | Chen | H02M 1/4258 |
| | | | | 363/16 |
| 8,711,580 | B2* | 4/2014 | Zhang | H02M 1/32 |
| | | | | 363/133 |
| 10,366,193 | B2* | 7/2019 | Vanapalli | G06F 30/39 |
| 10,498,217 | B1* | 12/2019 | Karin | H02M 7/493 |
| 10,536,095 | B1* | 1/2020 | Pastorina | H02M 7/043 |
| 10,693,365 | B2* | 6/2020 | Yamada | H02M 1/44 |
| 10,848,050 | B2* | 11/2020 | Karin | H02J 3/38 |
| 10,990,738 | B2* | 4/2021 | Vanapalli | G06F 30/39 |
| 10,992,226 | B1* | 4/2021 | Aboueldahab | H02M 3/072 |
| 11,228,202 | B2* | 1/2022 | Mohr | G06F 1/263 |
| 11,855,532 | B2* | 12/2023 | Aboueldahab | G01R 31/40 |
| 12,126,250 | B2* | 10/2024 | Lu | H02M 1/0096 |
| 2003/0090918 | A1* | 5/2003 | Shenai | H02M 3/1588 |
| | | | | 363/127 |
| 2005/0225176 | A1* | 10/2005 | Gan | H02M 3/33561 |
| | | | | 307/31 |
| 2011/0292688 | A1* | 12/2011 | Zhang | H02M 1/32 |
| | | | | 363/21.02 |
| 2012/0307528 | A1* | 12/2012 | Humphrey | H02M 3/33592 |
| | | | | 363/17 |
| 2013/0063185 | A1* | 3/2013 | Ye | H02M 3/33571 |
| | | | | 327/108 |
| 2013/0329463 | A1* | 12/2013 | Chen | H02M 1/42 |
| | | | | 363/17 |
| 2015/0288289 | A1* | 10/2015 | Qu | H02M 3/33592 |
| | | | | 363/17 |
| 2016/0371415 | A1* | 12/2016 | Vanapalli | G06F 30/39 |
| 2018/0027619 | A1* | 1/2018 | Xiong | H02M 1/32 |
| | | | | 315/291 |
| 2019/0294749 | A1* | 9/2019 | Vanapalli | G06F 30/39 |
| 2019/0356236 | A1* | 11/2019 | Yamada | H02M 1/44 |
| 2020/0073466 | A1* | 3/2020 | Walsh | G06F 1/263 |
| 2022/0271679 | A1* | 8/2022 | Sharma | H02M 5/4585 |
| 2022/0416664 | A1* | 12/2022 | Wu | H02M 3/1584 |
| 2023/0026740 | A1* | 1/2023 | Lu | H02J 9/061 |

FOREIGN PATENT DOCUMENTS

| | | | | | |
|---|---|---|---|---|---|
| CN | 109417353 | A | * | 3/2019 | B64D 47/00 |
| CN | 110943606 | A | * | 3/2020 | H02M 7/217 |
| CN | 112350358 | A | * | 2/2021 | H02M 3/3353 |
| CN | 114421752 | A | * | 4/2022 | H02M 3/33569 |

OTHER PUBLICATIONS

Machine Translation CN-110943606-A (Year: 2020).*
Machine Translation CN-109417353-A (Year: 2019).*
Machine translation (Year: 2021).*
Machine translation CN-114421752-A (Year: 2022).*
Machine translation (Year: 2017).*

* cited by examiner

METHOD FOR CONTROLLING MULTIPLE POWER SUPPLIES

PRIORITY

This application claims the benefit of U.S. Provisional Application No. 63/368,267, filed on Jul. 13, 2022, entitled "Method for Controlling Multiple Power Supplies," which application is hereby incorporated herein by reference.

TECHNICAL FIELD

The present invention relates to a method for controlling multiple power supplies, and, in particular embodiments, to a method for configuring the multiple power supplies to start in a sequential manner.

BACKGROUND

As technologies further advance, crypto mining has become one of the most computationally demanding activities. Crypto mining is the process of creating a cryptocurrency such as bitcoins. The crypto mining is performed by high-powered computers in a crypto mining farm. The crypto mining farm is essentially a data center including a plurality of high-powered computers. The high-powered computers may be also known as crypto miners. The crypto miners can be implemented as graphics processing units (GPUs) or application-specific integrated chips (ASICs).

In a crypto mining farm, a plurality of crypto miners is employed to mine together in a single location. A plurality of power supplies is connected in parallel to supply power to the plurality of crypto miners. In particular, each crypto miner is powered by a power supply. This power supply is connected between the electric grid and the crypto miner. The power supply is configured to convert the ac voltage of the electric grid into a voltage suitable for driving the crypto miner.

In the crypto mining farm, the power supplies are capable of maintaining the output voltages within a specified range for a given time period after a loss of the input power source. During the time period, the energy for supporting the output power is obtained from the hold-up capacitors. In order to have a long period after the loss of the input power source, the hold-up capacitors are of a relatively large capacitance value. In responses to such a relatively large capacitance value, the surge currents for charging the hold-up capacitors during a startup process can be very large.

In operation, if a plurality of power supplies in a crypto farm starts up at the same time instant and has the same startup slew rate, startup currents from the plurality of power supplies are added together to form an excessive surge current. Such an excessive surge current may damage fuses, circuit breakers, system connectors of the power supply system. Furthermore, nearby electrical equipment may be disturbed by the excessive surge current. It would be desirable to have a reliable and cost-effective method to control the startup process of the plurality of power supplies so that the surge current in the power supply system can be reduced.

SUMMARY

These and other problems are generally solved or circumvented, and technical advantages are generally achieved, by preferred embodiments of the present disclosure which provide a method for configuring a plurality of power supplies to start in a sequential manner.

In accordance with an embodiment, a method for controlling multiple power supplies comprises configuring a plurality of power supplies to provide power to respective loads coupled to the plurality of power supplies, wherein inputs of the plurality of power supplies are coupled to an input voltage bus, and during a startup process, coordinating the plurality of power supplies such that the plurality of power supplies is powered up in a controllable manner, wherein as a result of coordinating the plurality of power supplies, a surge current flowing through the input voltage bus is reduced.

In accordance with another embodiment, a system comprises a plurality of power supplies coupled between a power source and a plurality of loads, wherein each of the plurality of power supplies is configured to provide power to a corresponding load, and a system control apparatus configured to coordinating the plurality of power supplies during a startup process such that the plurality of power supplies is powered up in a sequential manner.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for configuring a plurality of power supplies to start in a sequential manner. The disclosure may also be applied, however, to a variety of power conversion systems. Hereinafter, various embodiments will be explained in detail with reference to the accompanying drawings.

Figure 1:
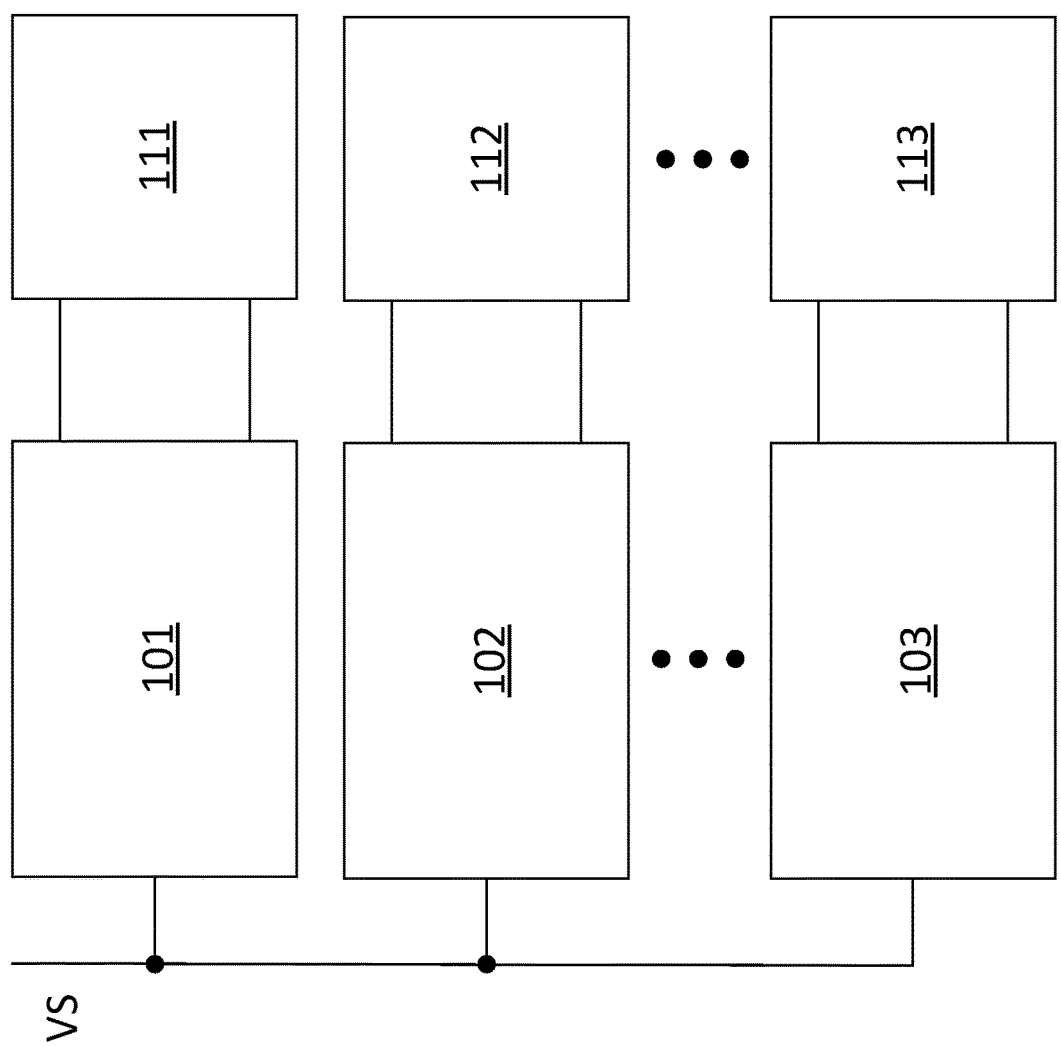
FIG. 1 illustrates a block diagram of a power conversion system comprising a plurality of power supplies in accordance with various embodiments of the present disclosure.

FIG. 1 illustrates a block diagram of a power conversion system comprising a plurality of power supplies in accordance with various embodiments of the present disclosure. The power conversion system comprises a plurality of power supplies 101, 102 and 103 coupled between an input voltage bus VS and respective load 111, 112 and 113. As shown in FIG. 1, the input of each power supply (e.g., power supply 101) is connected to the input voltage bus VS. The outputs of each power supply (e.g., power supply 101) are connected to a corresponding load (e.g., load 111).

In some embodiments, the loads (e.g., load 111) are a plurality of crypto miners in a crypto farm. Each crypto miner may comprise a plurality of graphics processing units (GPUs), a plurality of application-specific integrated chips (ASICs), any combinations thereof and the like.

In some embodiments, the input voltage bus VS is coupled to an ac power source. The power source may be generated from a power substation of the electric grid. It should be noted that the input voltage bus VS may be not coupled to the ac power source directly. Some power conversion elements such as rectifiers and filters may be coupled between the input voltage bus VS and the ac power source.

In some embodiments, each power supply (e.g., power supply 101) includes a power factor correction stage and a dc/dc power conversion stage. The power factor correction stage is implemented as a boost converter. The dc/dc power conversion stage may be implemented as an isolated power converter such as a forward converter, a flying converter, a fly-forward converter, a full bridge converter, a half bridge converter, an inductor-inductor-capacitor (LLC) resonant converter, any combinations thereof and the like. Alternatively, the power factor correction stage is an isolated power converter with a forward topology, a fly-forward topology, a flyback topology, any combinations thereof and the like. The dc/dc power conversion stage may be implemented as an isolated dc/dc converter such as a forward converter, a flying converter, a fly-forward converter, a full bridge converter, a half bridge converter, an LLC resonant converter, any combinations thereof and the like. Alternatively, the dc/dc power conversion stage may be implemented as a non-isolated dc/dc converter such as a buck converter, a boost converter, a buck-boost converter, any combinations thereof and the like.

In operation, a system controller (not shown) is configured to determine the startup sequence of the plurality of power supplies. In particular, the plurality of power supplies is not started at the same time. The plurality of power supplies is started in a sequential manner to reduce the surge current during the startup of the power conversion system. The detailed implementations will be discussed below with respect to FIGS. 2-6.

One advantageous feature of having the power conversion system shown in FIG. 1 is that the plurality of power supplies 101, 102 and 103 is able to start in a sequential manner so as to reduce the magnitude of the surge current.

In operation, each power supply comprises an LLC resonant power converter. The initial switching frequency of each power supply is higher than the resonant frequency of the LLC resonant power converter. During the startup process, each power supply has a different frequency transition time (from the initial switching frequency to the resonant frequency). The different frequency transition time helps to reduce the surge current during the startup of the power conversion system. The detailed implementation of this control method will be discussed below with respect to FIGS. 11-12.

In operation, each power supply has a different soft start time. The different soft start time helps to reduce the surge current during the startup of the power conversion system. The detailed implementation of this control method will be discussed below with respect to FIGS. 13-14.

In operation, the soft start time of the plurality of power supplies is divided into a plurality of time durations. In each time duration of the plurality of time durations, the plurality of power supplies 101, 102 and 103 has different slew rates. The different slew rates help to reduce the surge current during the startup of the power conversion system. The detailed implementation of this control method will be discussed below with respect to FIGS. 15-16.

Figure 2:
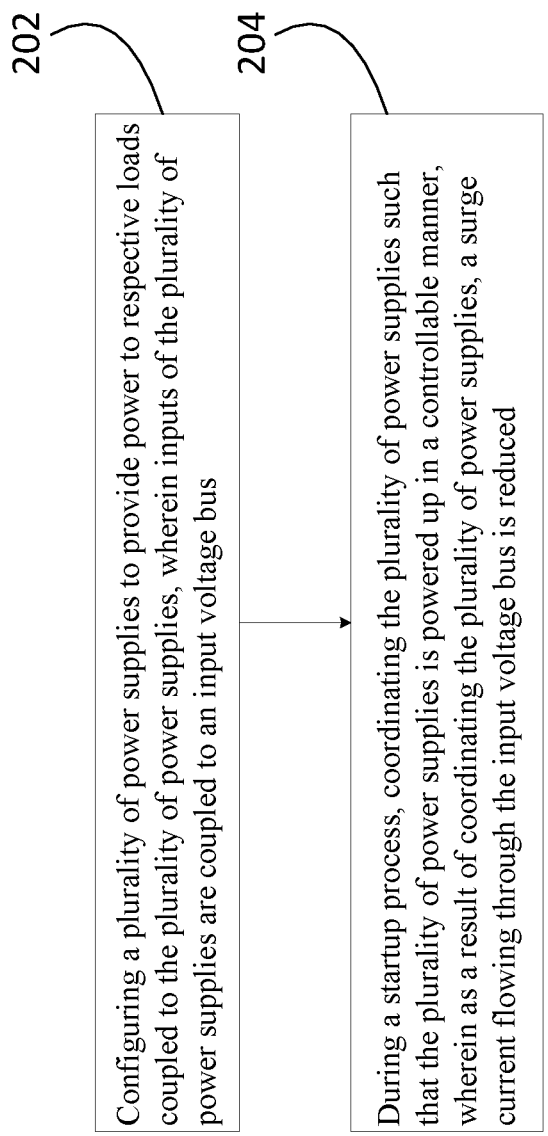
FIG. 2 illustrates a flow chart of a first method for controlling the plurality of power supplies shown in FIG. 1 in accordance with various embodiments of the present disclosure.

FIG. 2 illustrates a flow chart of a first method for controlling the plurality of power supplies shown in FIG. 1 in accordance with various embodiments of the present disclosure. This flowchart shown in FIG. 2 is merely an example, which should not unduly limit the scope of the claims. One of ordinary skill in the art would recognize many variations, alternatives, and modifications. For example, various steps illustrated in FIG. 2 may be added, removed, replaced, rearranged and repeated.

Referring back to FIG. 1, the plurality of power supplies 101, 102 and 103 is coupled to a same voltage bus. In order to reduce the surge current flowing through the voltage bus, the voltages at the outputs of the plurality of power supplies cannot be established at the same time. In other words, the startup times of the system are configured such that the plurality of power supplies 101, 102 and 103 is powered up in a sequential manner.

At step 202, a plurality of power supplies is configured to provide power to respective loads coupled to the plurality of power supplies. The inputs of the plurality of power supplies are coupled to an input voltage bus.

At step 204, during a startup process, the plurality of power supplies is coordinated such that the plurality of power supplies is powered up in a controllable manner. As a result of coordinating the plurality of power supplies, a surge current flowing through the input voltage bus is reduced.

In some embodiments, each of the plurality of power supplies comprises a non-isolated power factor correction device and an isolated dc/dc converter connected in cascade between a power source and a load. The non-isolated power factor correction device is a boost converter. The isolated dc/dc converter is a forward converter. The loads are a plurality of crypto mining machines.

In alternative embodiments, each of the plurality of power supplies comprises an isolated power factor correction device and a dc/dc converter connected in cascade between a power source and a load. The isolated power factor correction device is a forward converter.

Figure 3:
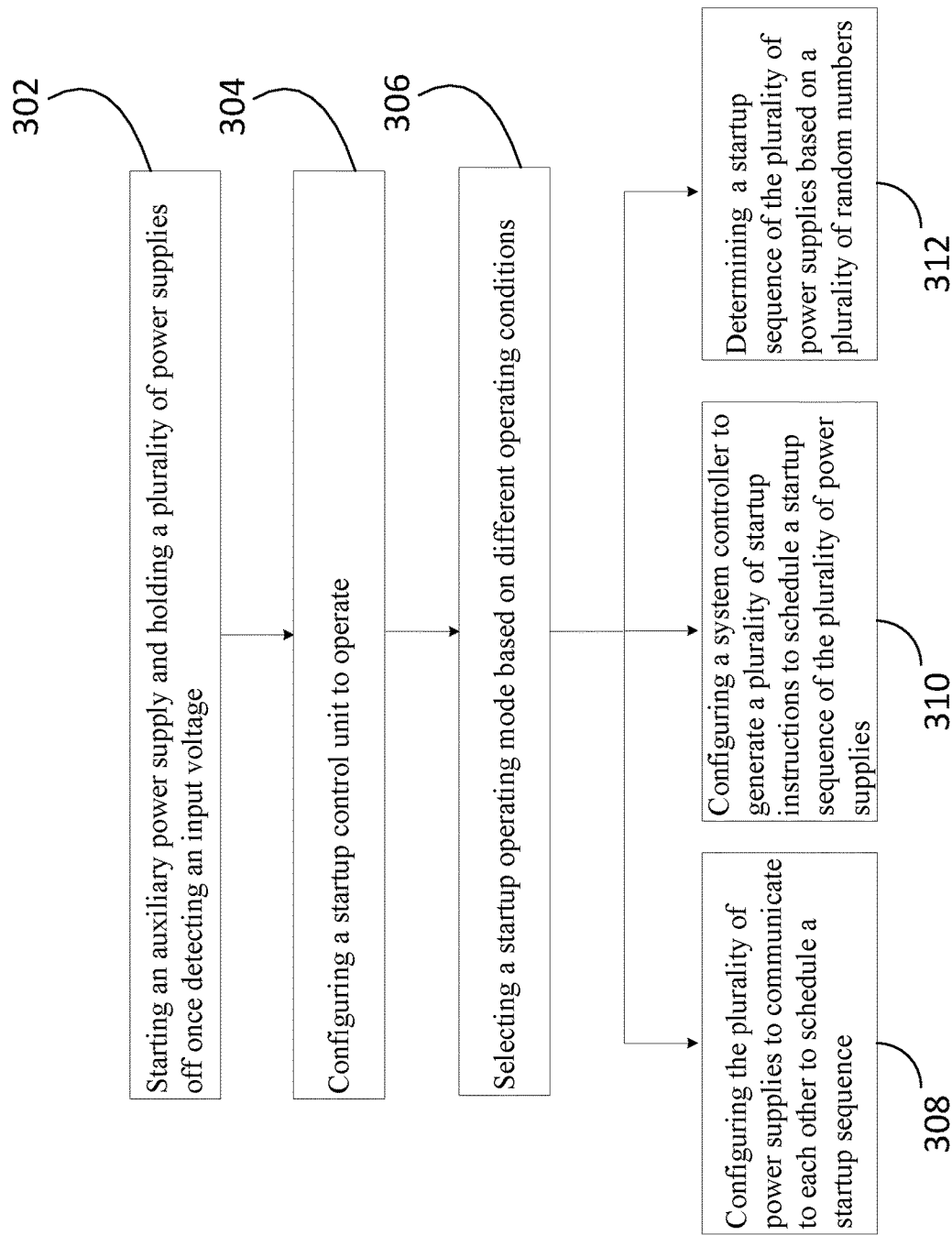
FIG. 3 illustrates a flow chart of a second method for controlling the plurality of power supplies shown in FIG. 1 in accordance with various embodiments of the present disclosure.

FIG. 3 illustrates a flow chart of a second method for controlling the plurality of power supplies shown in FIG. 1 in accordance with various embodiments of the present disclosure. This flowchart shown in FIG. 3 is merely an example, which should not unduly limit the scope of the claims. One of ordinary skill in the art would recognize many variations, alternatives, and modifications. For example, various steps illustrated in FIG. 3 may be added, removed, replaced, rearranged and repeated.

At step 302, once an input voltage is detected, an auxiliary power supply is started and the plurality of power supplies is held off.

At step 304, a startup control unit is configured to operate. More particularly, the startup control unit is employed to control the startup sequence of the plurality of power supplies.

At step 306, an operating mode is selected based on different operating conditions. Depending on different operating conditions, there may be three different operating modes during a startup process of the power conversion system. A first operating mode is illustrated at step 308. A second operating mode is illustrated at step 310. A third operating mode is illustrated at step 312.

At step 308, the plurality of power supplies is configured to communicate to each other to schedule a startup sequence. The detailed operating principle of the first operating mode will be described below with respect to FIG. 4.

At step 310, a system controller is configured to generate a plurality of startup instructions to schedule a startup sequence of the plurality of power supplies. The detailed operating principle of the second operating mode will be described below with respect to FIG. 5.

At step 312, a startup sequence of the plurality of power supplies is determined based on a plurality of random numbers. The detailed operating principle of the third operating mode will be described below with respect to FIG. 6.

Figure 4:
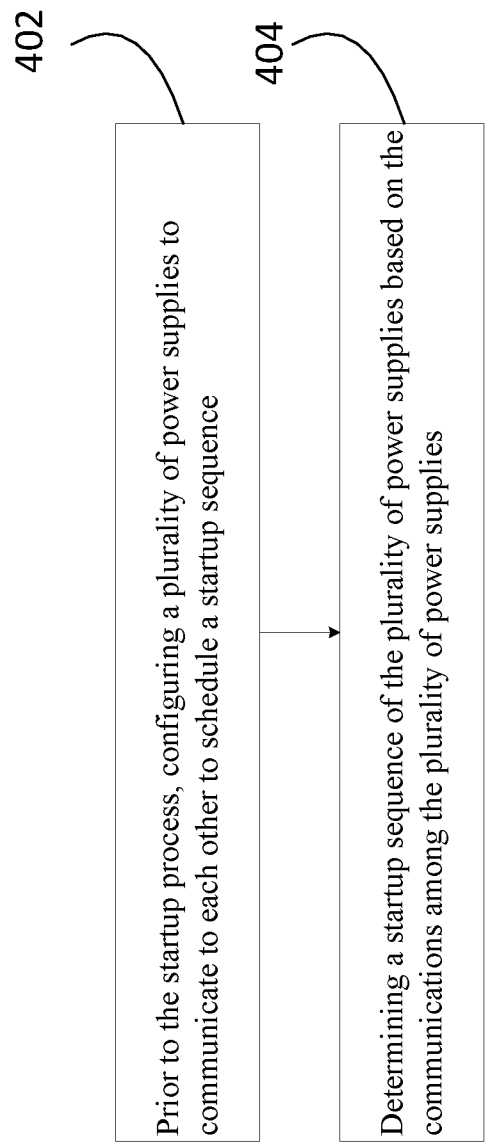
FIG. 4 illustrates a flow chart of configuring the plurality of power supplies shown in FIG. 1 to power up in a first operating mode in accordance with various embodiments of the present disclosure.

FIG. 4 illustrates a flow chart of configuring the plurality of power supplies shown in FIG. 1 to power up in a first operating mode in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

At step 402, prior to a startup process, a plurality of power supplies communicates to each other to schedule a startup sequence.

At step 404, a startup sequence of the plurality of power supplies is determined based on the communications among the plurality of power supplies.

In some embodiments, the plurality of power supplies communicates to each other through sending and receiving radio signals. The radio signals may be transferred through suitable wireless networks such as WIFI, ZigBee, Bluetooth, any combinations thereof and the like. In alternative embodiments, the plurality of power supplies communicates to each other through transferring data over existing power lines.

Figure 5:
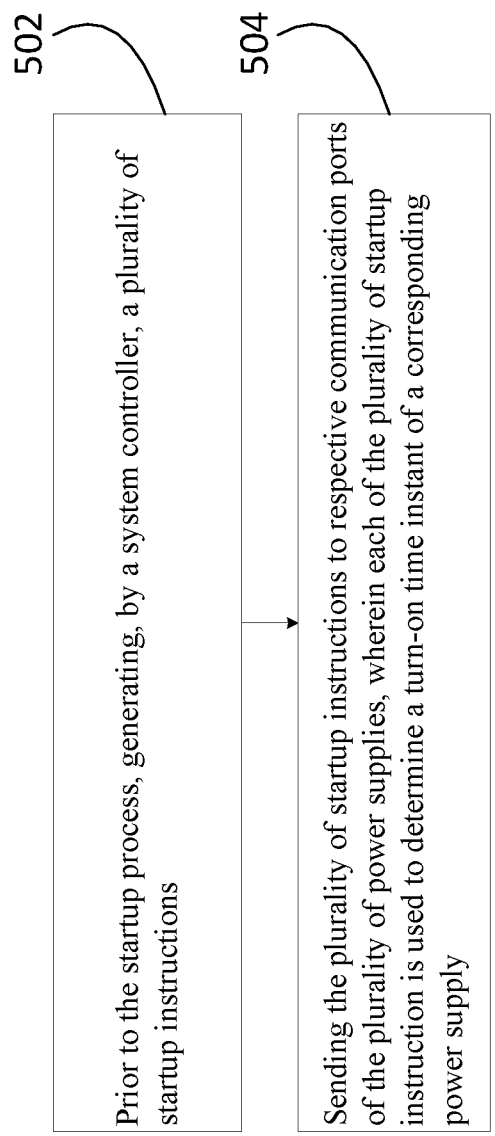
FIG. 5 illustrates a flow chart of configuring the plurality of power supplies shown in FIG. 1 to power up in a second operating mode in accordance with various embodiments of the present disclosure.

FIG. 5 illustrates a flow chart of configuring the plurality of power supplies shown in FIG. 1 to power up in a second operating mode in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, prior to a startup process, a system controller generates a plurality of startup instructions.

At step 504, the plurality of startup instructions is sent to respective communication ports of the plurality of power supplies. Each of the plurality of startup instruction is used to determine a turn-on time instant of a corresponding power supply.

In operation, the turn-on time instants of the plurality of power supplies are different. The different turn-on time instants of the plurality of power supplies help to reduce the surge current during the startup of the power conversion system.

Figure 6:
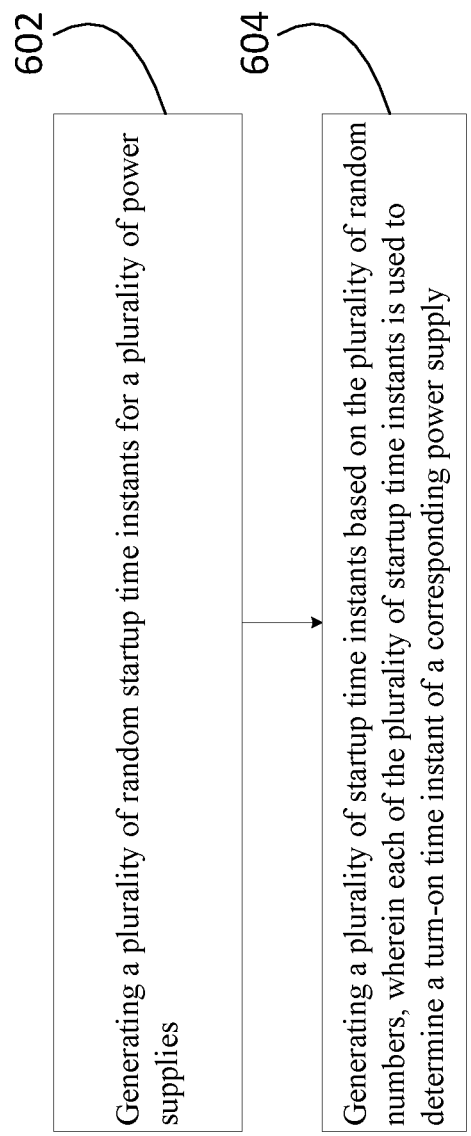
FIG. 6 illustrates a flow chart of configuring the plurality of power supplies shown in FIG. 1 to power up in a third operating mode in accordance with various embodiments of the present disclosure.

FIG. 6 illustrates a flow chart of configuring the plurality of power supplies shown in FIG. 1 to power up in a third operating mode in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

At step 602, a plurality of random startup time instants is generated for a plurality of power supplies.

At step 604, a plurality of startup time instants is generated based on the plurality of random numbers. Each of the plurality of startup time instants is used to determine a turn-on time instant of a corresponding power supply In operation, the turn-on time instants of the plurality of power supplies are different because the turn-on time instants are generated based on the plurality of random numbers. The different turn-on time instants of the plurality of power supplies help to reduce the surge current during the startup of the power conversion system.

Figure 7:
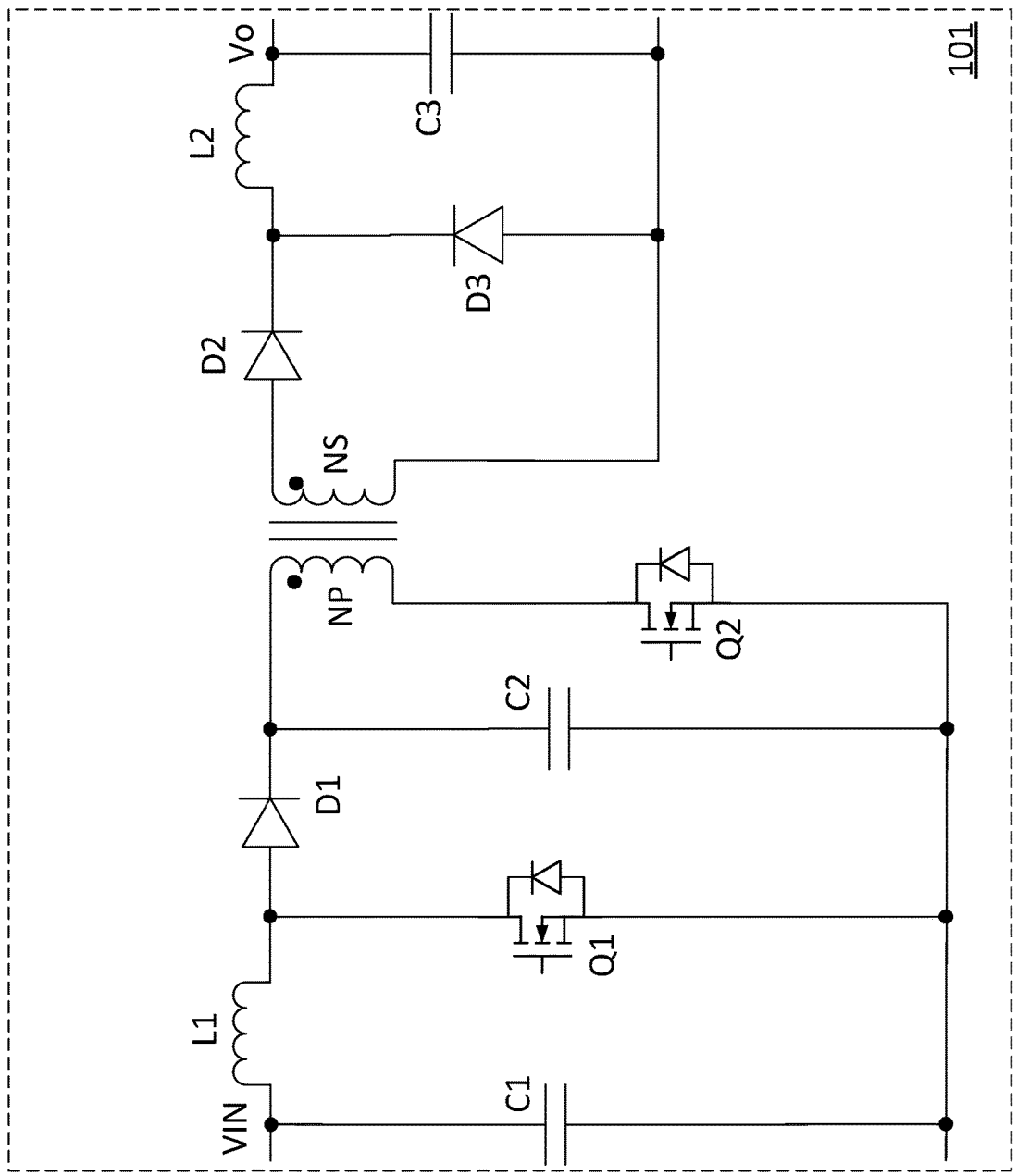
FIG. 7 illustrates a schematic diagram of a first implementation of the power supply shown in FIG. 1 in accordance with various embodiments of the present disclosure.

FIG. 7 illustrates a schematic diagram of a first implementation of the power supply shown in FIG. 1 in accordance with various embodiments of the present disclosure. The power supply 101 has two inputs. One input (VIN) is coupled to the voltage bus VS shown in FIG. 1. The other input is connected to ground. As shown in FIG. 7, the power supply 101 comprises a non-isolated power converter and an isolated power converter connected in cascade. As shown in FIG. 7, the non-isolated power converter is a boost converter. The boost converter is configured to operate as a power factor correction stage of the power supply 101. The output capacitor of the boost converter functions as a hold-up capacitor. The isolated power converter is a forward converter. The forward converter is configured to covert the voltage across the output capacitor of the boost converter into a voltage suitable for the load connected at the output Vo of the power supply 101.

It should be noted the forward converter shown in FIG. 7 is merely an example, which should not unduly limit the scope of the claims. One of ordinary skill in the art would recognize many variations, alternatives, and modifications. For example, depending on different applications and design needs, other relevant circuits such as an active clamp may be included to achieve better efficiency.

As shown in FIG. 7, the boost converter comprises an input capacitor C1, an inductor L1, a switch Q1 and a diode D1 and an output capacitor C2. As shown in FIG. 7, a first terminal of L1 is coupled to the input VIN of the boost converter. A second terminal of L1 is coupled to an anode of the diode D1. The switch Q1 is coupled between a common node of L1 and the diode D1, and ground. The output capacitor C2 is coupled between a cathode of the diode D1 and ground.

The primary side circuit of the forward converter comprises the primary switch Q2 and the primary winding NP of the transformer connected in series. The secondary side circuit of the forward converter comprises a rectifier and a filter connected in cascade between the secondary winding NS of the transformer and the load. As shown in FIG. 7, the rectifier comprises a first rectifier diode D2 and a second rectifier diode D3. The filter comprises an output inductor L2 and an output capacitor C3. As shown in FIG. 7, an anode of the first rectifier diode D2 is connected to a first terminal of the secondary winding NS of the transformer. An anode of the second rectifier diode D3 is connected to a second terminal of the secondary winding NS of the transformer. A cathode of the first rectifier diode D2 and a cathode of the second rectifier diode D3 are connected together and further connected to a first terminal of the output inductor L2. A second terminal of the output inductor L2 is connected to a first terminal of the output capacitor C3. A second terminal of the output capacitor C3 is connected to the second terminal of the secondary winding NS of the transformer.

It should be noted that the diagram shown in FIG. 7 is merely an example, which should not unduly limit the scope of the claims. One of ordinary skill in the art would recognize many variations, alternatives, and modifications. For example, the non-isolated power converter may be implemented as any other suitable power factor correction devices. Furthermore, diodes D1, D2 and D3 may be replaced by high efficiency switching elements.

In accordance with an embodiment, the switches of FIG. 7 (e.g., switches Q1-Q2) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 7 shows the switches Q1-Q2 are implemented as single n-type transistors, a person skilled in the art would recognize there may be many variations, modifications and alternatives. For example, depending on different applications and design needs, at least some of the switches may be implemented as p-type transistors. Furthermore, each switch shown in FIG. 7 may be implemented as a plurality of switches connected in parallel. Moreover, a capacitor may be connected in parallel with one switch to achieve zero voltage switching (ZVS)/zero current switching (ZCS).

Figure 8:
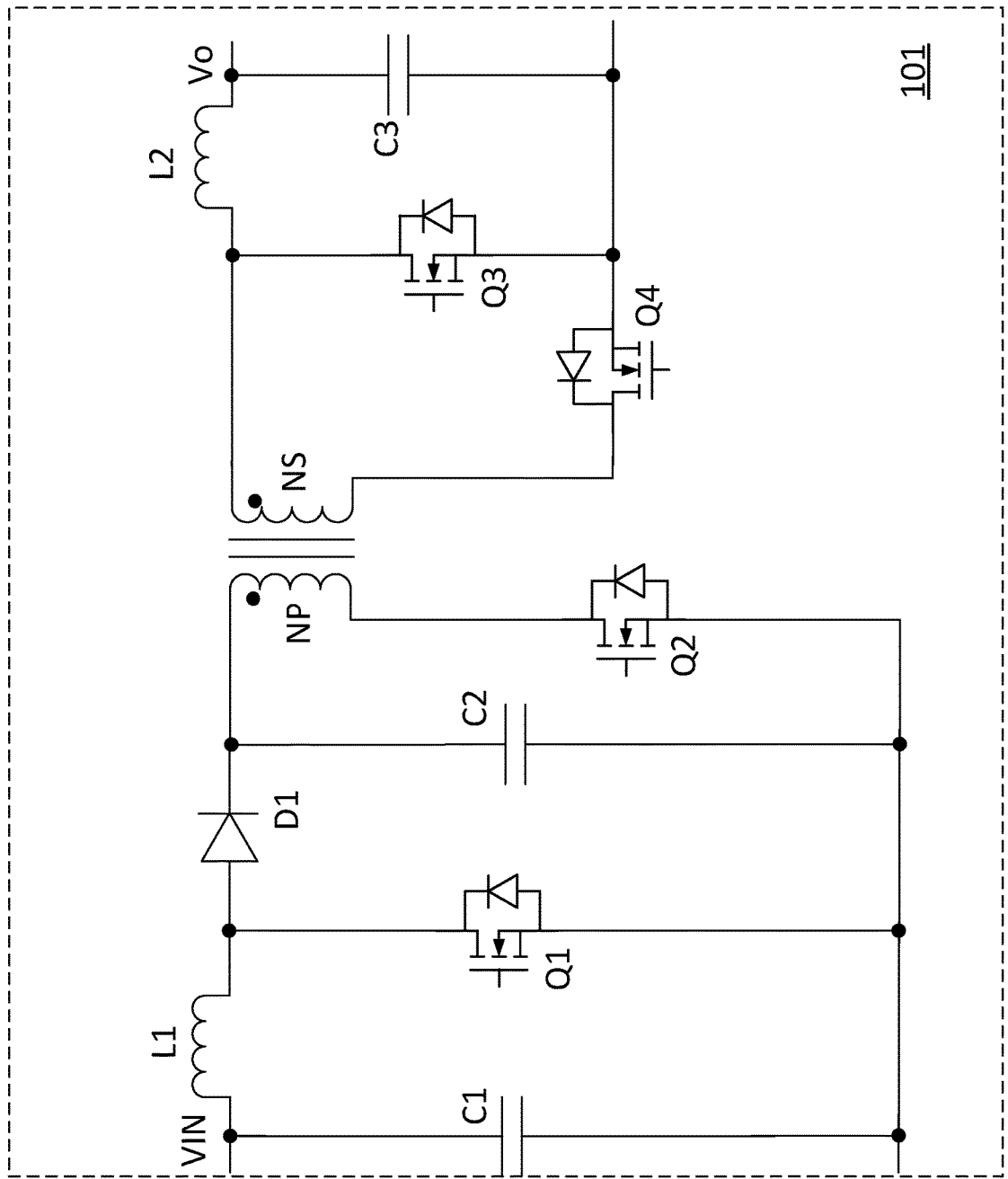
FIG. 8 illustrates a schematic diagram of a second implementation of the power supply shown in FIG. 1 in accordance with various embodiments of the present disclosure.

FIG. 8 illustrates a schematic diagram of a second implementation of the power supply shown in FIG. 1 in accordance with various embodiments of the present disclosure. The second implementation of the power supply shown in FIG. 8 is similar to the first implementation of the power supply shown in FIG. 7 except that the first rectifier diode and the second rectifier diode are replaced by two rectifier switches, respectively. It should be noted that replacement shown in FIG. 8 is merely an example. A person skilled in the art would understand there are many variations. For example, the first rectifier diode and the second rectifier diode are replaced by two MOSFET switches, a combination of MOSFET switches and diodes, any combinations thereof and the like.

As shown in FIG. 8, the rectifier comprises a first rectifier switch Q3 and a second rectifier switch Q4. The filter comprises an output inductor L2 and an output capacitor C3. A drain of the first rectifier switch Q3 is connected to a first terminal of a secondary winding NS of the transformer. A drain of the second rectifier switch Q4 is connected to a second terminal of the secondary winding NS of the transformer. A source of the first rectifier switch Q3 and a source of the second rectifier switch Q4 are connected together and further connected to a second terminal of the output capacitor C3. A first terminal of the output inductor L2 is connected to the first terminal of the secondary winding NS of the transformer. A first terminal of the output capacitor C3 is connected to a second terminal of the output inductor L2.

Figure 9:
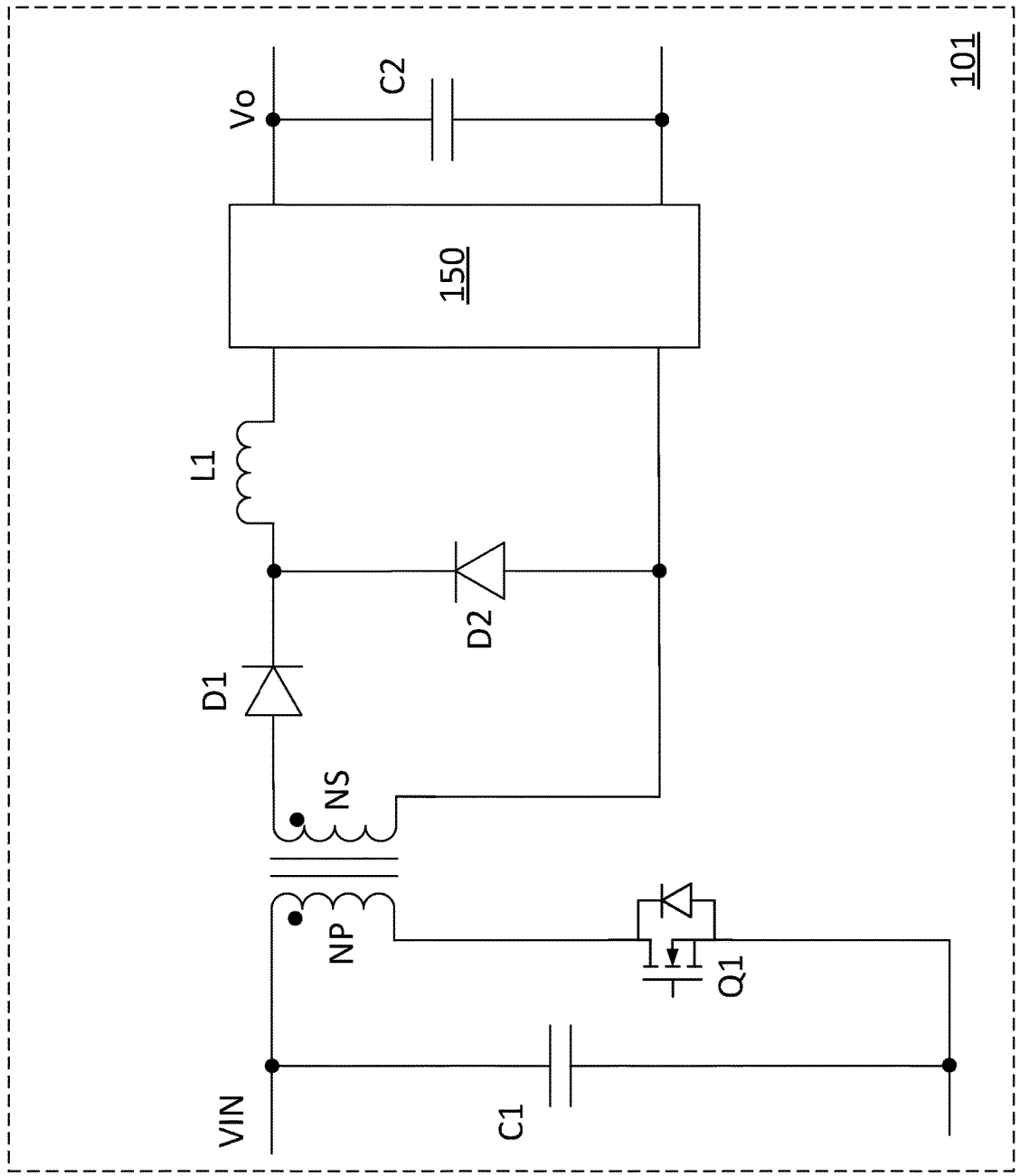
FIG. 9 illustrates a schematic diagram of a third implementation of the power supply shown in FIG. 1 in accordance with various embodiments of the present disclosure.

FIG. 9 illustrates a schematic diagram of a third implementation of the power supply shown in FIG. 1 in accordance with various embodiments of the present disclosure. The power supply 101 comprises an isolated power converter and a downstream converter 150 connected in cascade.

The primary side power network of the isolated power converter comprises an input capacitor C1 and a switch Q1 connected in series with a primary winding NP of the transformer. The secondary side power network of the isolated power converter is coupled between a secondary side of the transformer and the downstream converter 150. In particular, the secondary side power network comprises a rectifier and a filter connected in cascade between the secondary side of the transformer and the downstream converter 150.

The rectifier comprises a first rectifier diode D1 and a second rectifier diode D2. The filter comprises an output inductor L1 and the output capacitor C2. As shown in FIG. 9, an anode of the first rectifier diode D1 is connected to a first terminal of a secondary winding NS of the transformer. An anode of the second rectifier diode D2 is connected to a second terminal of the secondary winding NS of the transformer. A cathode of the first rectifier diode D1 and a cathode of the second rectifier diode D2 are connected together and further connected to a first terminal of the output inductor L1. A second terminal of the output inductor L1 is connected to a first terminal of the output capacitor C2. A second terminal of the output capacitor C2 is connected to the second terminal of the secondary winding NS of the transformer.

As shown in FIG. 9, Q1 and NP form a primary side circuit of a forward converter. D1, D2, L1 and C2 form a secondary side circuit of the forward converter. The forward converter is configured to operate as a power factor correction stage of the power supply 101.

The downstream converter 150 is configured to covert the voltage across the capacitor C2 into a voltage suitable for the load connected at the output Vo of the power supply 101.

Figure 10:
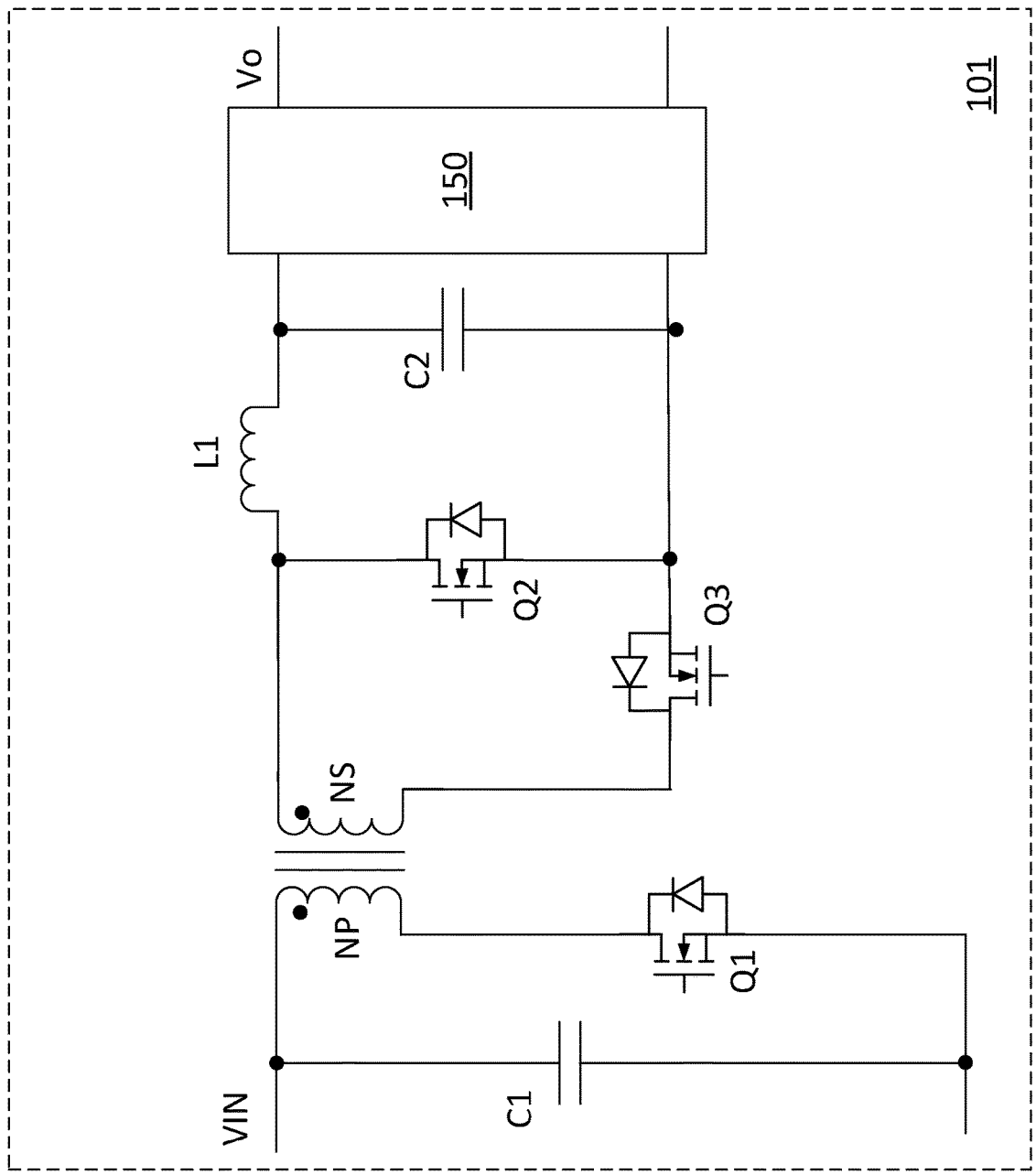
FIG. 10 illustrates a schematic diagram of a fourth implementation of the power supply shown in FIG. 1 in accordance with various embodiments of the present disclosure.

FIG. 10 illustrates a schematic diagram of a fourth implementation of the power supply shown in FIG. 1 in accordance with various embodiments of the present disclosure. The fourth implementation of the power supply shown in FIG. 10 is similar to the third implementation of the power supply shown in FIG. 9 except that the first rectifier diode and the second rectifier diode are replaced by two rectifier switches, respectively. It should be noted that replacement shown in FIG. 10 is merely an example. A person skilled in the art would understand there are many variations. For example, the first rectifier diode and the second rectifier diode are replaced by two MOSFET switches, a combination of MOSFET switches and diodes, any combinations thereof and the like.

As shown in FIG. 10, the rectifier comprises a first rectifier switch Q2 and a second rectifier switch Q3. The filter comprises an output inductor L1 and an output capacitor C2. A drain of the first rectifier switch Q2 is connected to a first terminal of a secondary winding NS of the transformer. A drain of the second rectifier switch Q3 is connected to a second terminal of the secondary winding NS of the transformer. A source of the first rectifier switch Q2 and a source of the second rectifier switch Q3 are connected together and further connected to a second terminal of the output capacitor C2. A first terminal of the output inductor L1 is connected to the first terminal of the secondary winding NS of the transformer. A first terminal of the output capacitor C2 is connected to a second terminal of the output inductor L1.

Figure 11:
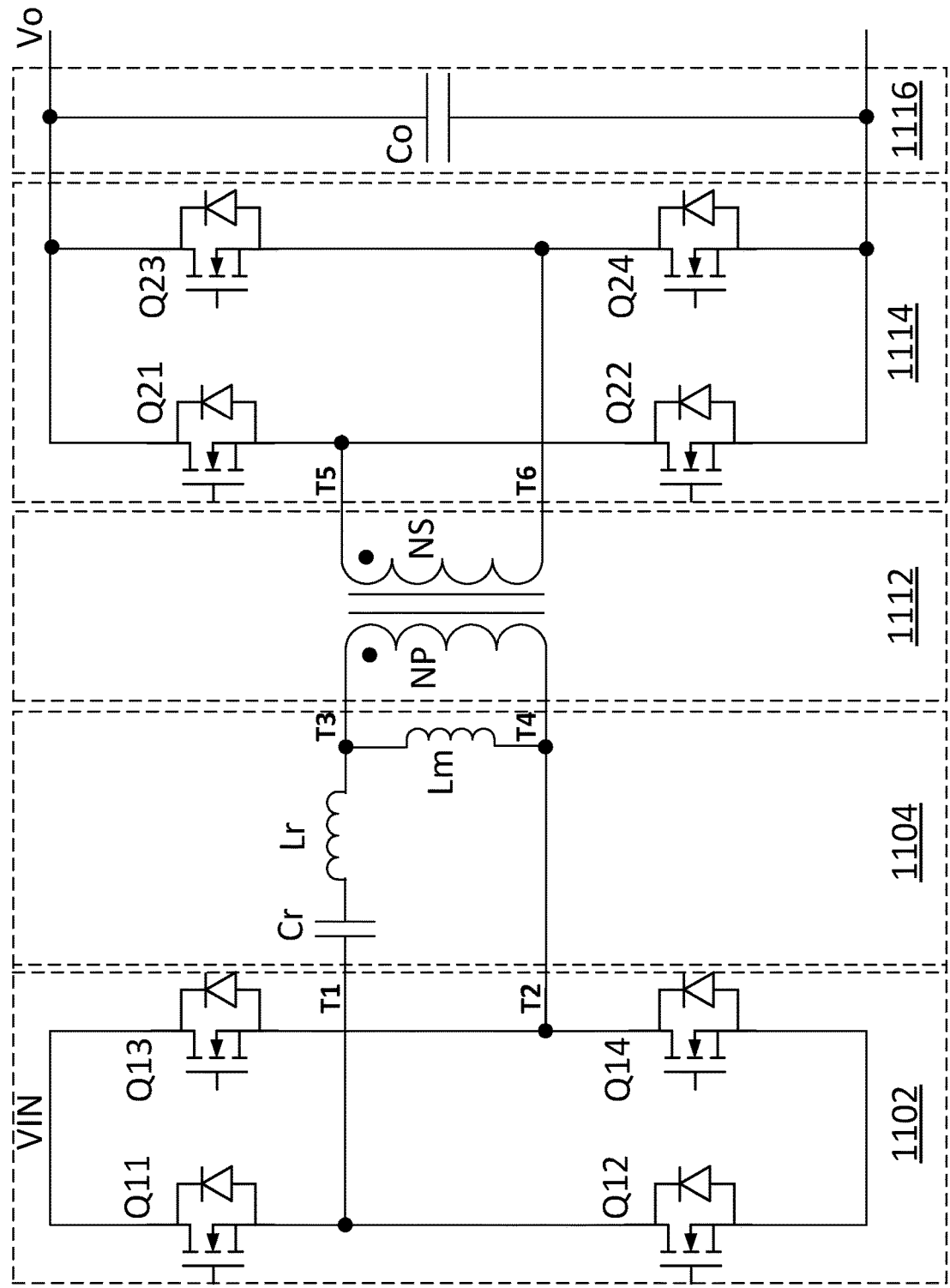
FIG. 11 illustrates a schematic diagram of a fifth implementation of the power supply shown in FIG. 1 in accordance with various embodiments of the present disclosure.

FIG. 11 illustrates a schematic diagram of a fifth implementation of the power supply shown in FIG. 1 in accordance with various embodiments of the present disclosure. The power supply comprises an inductor-inductor-capacitor (LLC) resonant converter. The LLC resonant converter comprises a switch network 1102, a resonant tank 1104, a transformer 1112, a rectifier 1114 and an output filter 1116. As shown in FIG. 11, the switch network 1102, the resonant tank 1104, the transformer 1112, the rectifier 1114 and the output filter 1116 are coupled to each other and connected in cascade between the input dc power source VIN and a load (not shown) coupled to the output of the LLC resonant converter.

The switch network 1102 includes four switching elements, namely Q11, Q12, Q13 and Q14. As shown in FIG. 11, a first pair of switching elements Q11 and Q12 are connected in series. A second pair of switching elements Q13 and Q14 are connected in series. The common node of the switching elements Q11 and Q12 is coupled to a first input terminal T1 of the resonant tank 1104. Likewise, the common node of the switching elements Q13 and Q14 is coupled to a second input terminal T2 of the resonant tank 1104.

FIG. 11 further illustrates the resonant tank 1104 is coupled between the switch network 1102 and the transformer 1112. The resonant tank 1104 is formed by a series resonant inductor Lr, a series resonant capacitor Cr and a parallel inductance Lm. As shown in FIG. 11, the series resonant inductor Lr and the series resonant capacitor Cr are connected in series and further coupled to the primary side of the transformer 1112.

It should be noted while FIG. 11 shows the series resonant inductor Lr is an independent component, the series resonant inductor Lr may be replaced by the leakage inductance of the transformer 1112. In other words, the leakage inductance (not shown) may function as the series resonant inductor Lr.

It should further be noted while FIG. 11 shows the resonant tank is placed on the primary side of the LLC resonant converter, this diagram is merely an example. A person skilled in the art will recognize many variations, alternatives and modifications. For example, the resonant tank may be placed on the secondary side. Furthermore, the resonant tank may be placed on both sides of the transformer 1112.

The transformer 1112 may be of a primary winding NP and a secondary winding NS. The primary winding is coupled to terminals T3 and T4 of the resonant tank 1104 as shown in FIG. 11. The secondary winding is coupled to the output of the LLC resonant converter through the rectifier 1114, which is a full-bridge rectifier comprising switches Q21, Q22, Q23 and Q24.

As shown in FIG. 11, switches Q21 and Q22 are connected in series and further coupled between two terminals of the output capacitor Co. Switches Q23 and Q24 are connected in series and further coupled between the two terminals of the output capacitor Co. The common node T5 of the switches Q21 and Q22 is coupled to a first terminal of the secondary winding of the transformer 1112. Likewise, the common node T6 of the switches Q23 and Q24 is coupled to a second terminal of the secondary winding of the transformer 1112.

It should be noted the transformer structure shown in FIG. 11 is merely an example. One person skilled in the art will recognize many alternatives, variations and modification. For example, the secondary side of the transformer 1112 may be a center tapped transformer winding. As a result, the secondary side may employ a synchronous rectifier formed by two switching elements. The operation principle of a synchronous rectifier coupled to a center tapped transformer winding is well known, and hence is not discussed in further detail herein to avoid repetition.

It should further be noted that the power topology of the LLC resonant converter may be not only applied to the rectifier as shown in FIG. 11, but also applied to other secondary configurations, such as voltage doubler rectifiers, current doubler rectifiers, any combinations thereof and/or the like.

In operation, when the switching frequency of the LLC resonant converter is equal to the resonant frequency of the resonant tank of the LLC resonant converter, the LLC resonant converter may have a unity system gain. On the other hand, when the switching frequency of the LLC resonant converter is higher than the resonant frequency, the LLC resonant converter is of a lower system gain.

During a startup process of the LLC resonant converter, the LLC resonant converter is configured to operate at an initial switching frequency (e.g., a higher switching frequency), thereby having a lower system gain. In the startup process, the switching frequency is reduced gradually. Once the startup process finishes, the LLC resonant converter operates at the resonant frequency.

Referring back to FIG. 1, the plurality of power supplies shown in FIG. 1 may different frequency transition times (from the initial switching frequency to the resonant frequency). The different frequency transition times help to reduce the surge current during the startup process.

Figure 12:
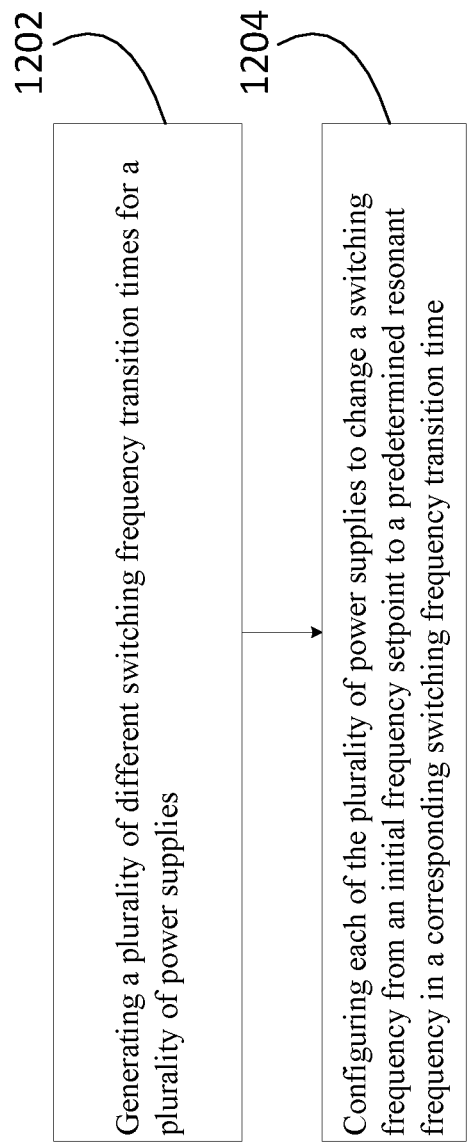
FIG. 12 illustrates a flow chart of a method for controlling the power supply shown in FIG. 11 in accordance with various embodiments of the present disclosure.

FIG. 12 illustrates a flow chart of a method for controlling the power supply shown in FIG. 11 in accordance with various embodiments of the present disclosure. This flowchart shown in FIG. 12 is merely an example, which should not unduly limit the scope of the claims. One of ordinary skill in the art would recognize many variations, alternatives, and modifications. For example, various steps illustrated in FIG. 12 may be added, removed, replaced, rearranged and repeated.

Referring back to FIG. 1, the plurality of power supplies 101, 102 and 103 is coupled to a same voltage bus. In order to reduce the surge current flowing through the voltage bus, the voltages at the outputs of the plurality of power supplies cannot be established at the same time. In other words, the startup times of the system are configured such that the plurality of power supplies 101, 102 and 103 is powered up in a sequential manner. Powering up the plurality of power supplies in a sequential manner can be realized through controlling the switching frequency of each power supply of the plurality of power supplies. In particular, each power supply of FIG. 1 can be implemented as an LLC resonant converter as shown in FIG. 11. Through controlling the switching frequency of the LLC resonant converter, the startup of each power supply can be controlled such that the plurality of power supplies 101, 102 and 103 is powered up in a sequential manner.

At step 1202, a plurality of different switching frequency transition times is generated for the plurality of power supplies.

At step 1204, each of the plurality of power supplies is configured to change a switching frequency from an initial frequency setpoint to the predetermined resonant frequency in a corresponding switching frequency transition time.

In operation, the initial switching frequency of each power supply is set at a frequency away from the resonant frequency of the power supply. In some embodiments, the initial frequency is at least ten times greater than the resonant frequency.

During the startup process, in a predetermined transition time, the switching frequency is dynamically adjusted to change from the initial switching frequency to a final switching frequency approximately equal to the resonant frequency.

In operation, in order to reduce the surge current flowing through the voltage bus, each power supply has a different switching frequency transition time. As a result of having different switching frequency transition times, the surge current flowing through the voltage bus can be reduced accordingly.

Figure 13:
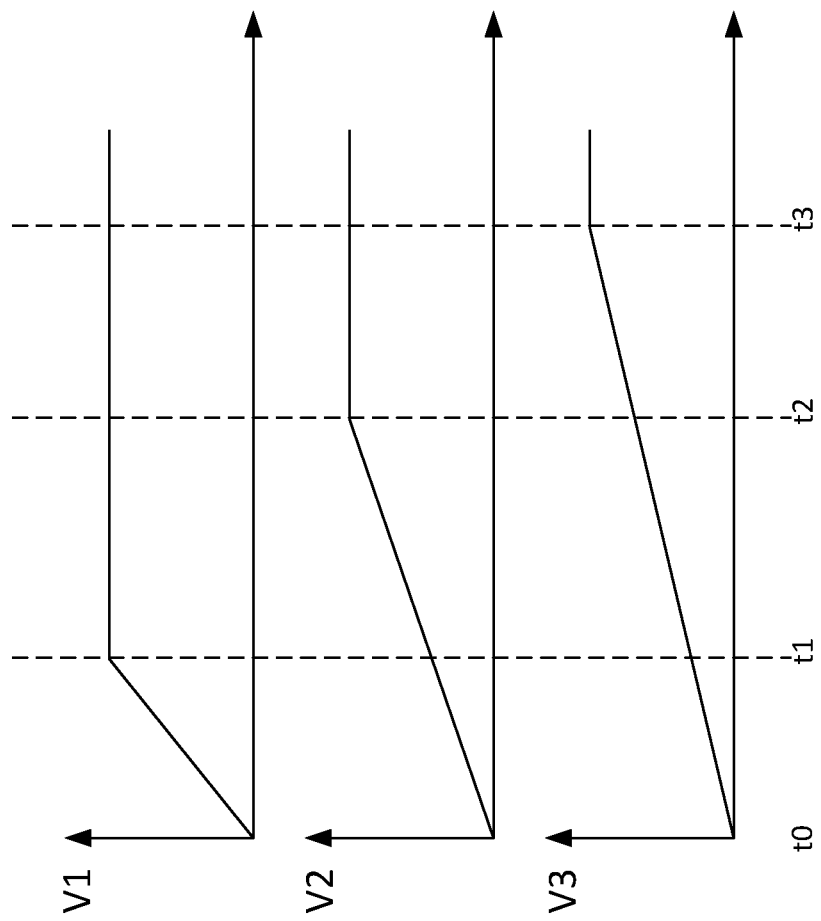
FIG. 13 illustrates various startup waveforms of the power supplies shown in FIG. 1 in accordance with various embodiments of the present disclosure.

FIG. 13 illustrates various startup waveforms of the power supplies shown in FIG. 1 in accordance with various embodiments of the present disclosure. The horizontal axis of FIG. 13 represents intervals of time. There may be three rows in FIG. 13. The first row represents the output voltage V1 of the power supply 101. The second row represents the output voltage V2 of the power supply 102. The third row represents the output voltage V3 of the power supply 103.

The first power supply 101 is of a first soft start time ranging from t0 to t1. The second power supply 102 is of a second soft start time ranging from t0 to t2. The third power supply 103 is of a third soft start time ranging from t0 to t3. Since the power supplies have different soft start times, the surge current flowing through the voltage bus can be reduced accordingly.

Figure 14:
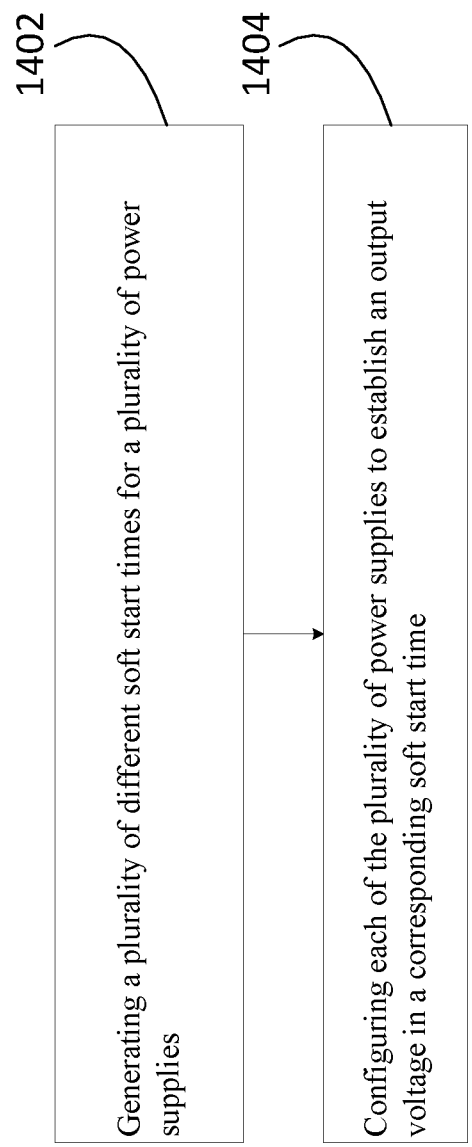
FIG. 14 illustrates a flow chart of a method for controlling the soft start processes of the power supplies shown in FIG. 1 in accordance with various embodiments of the present disclosure.

FIG. 14 illustrates a flow chart of a method for controlling the soft start processes of the power supplies shown in FIG. 1 in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

Referring back to FIG. 13, the plurality of power supplies 101, 102 and 103 is coupled to a same voltage bus. In order to reduce the surge current flowing through the voltage bus, the voltages at the outputs of the plurality of power supplies can be fully established at different time instants (e.g., t1, t2 and t3). In other words, the startup times of the power conversion system are configured such that the plurality of power supplies 101, 102 and 103 is powered up in a sequential manner.

At step 1402, a plurality of different soft start times is generated for the plurality of power supplies.

At step 1404, each of the plurality of power supplies is configured to establish an output voltage in a corresponding soft start time.

Figure 15:
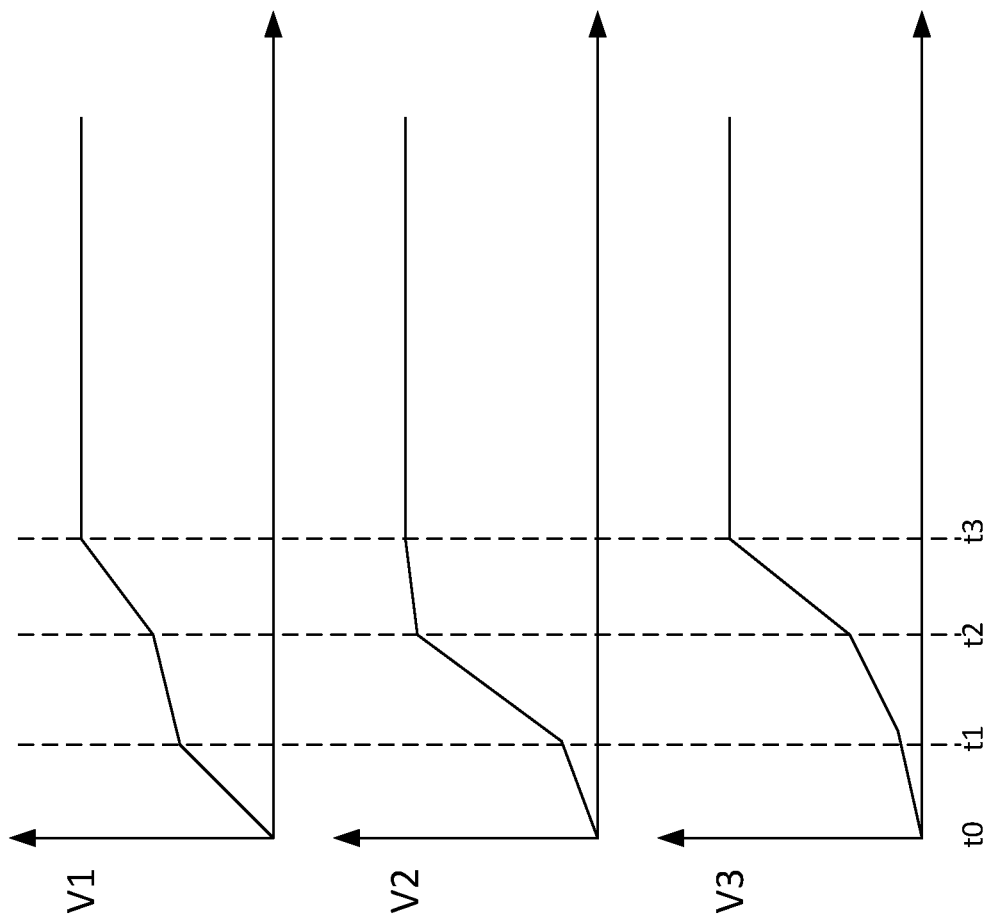
FIG. 15 illustrates various startup waveforms of the power supplies shown in FIG. 1 in accordance with various embodiments of the present disclosure.

FIG. 15 illustrates various startup waveforms of the power supplies shown in FIG. 1 in accordance with various embodiments of the present disclosure. The horizontal axis of FIG. 15 represents intervals of time. There may be three rows in FIG. 15. The first row represents the output voltage V1 of the power supply 101. The second row represents the output voltage V2 of the power supply 102. The third row represents the output voltage V3 of the power supply 103.

The plurality of power supplies has the same soft start time. The soft start process can be divided into a plurality of phases. The first phase of the soft start process is from t0 to t1. The second phase of the soft start process is from t1 to t2. The third phase of the soft start process is from t2 to t3. As shown in FIG. 15, in each startup phase, the plurality of power supplies has different slew rates. As a result of having different slew rates, the surge current flowing through the voltage bus can be reduced accordingly.

Figure 16:
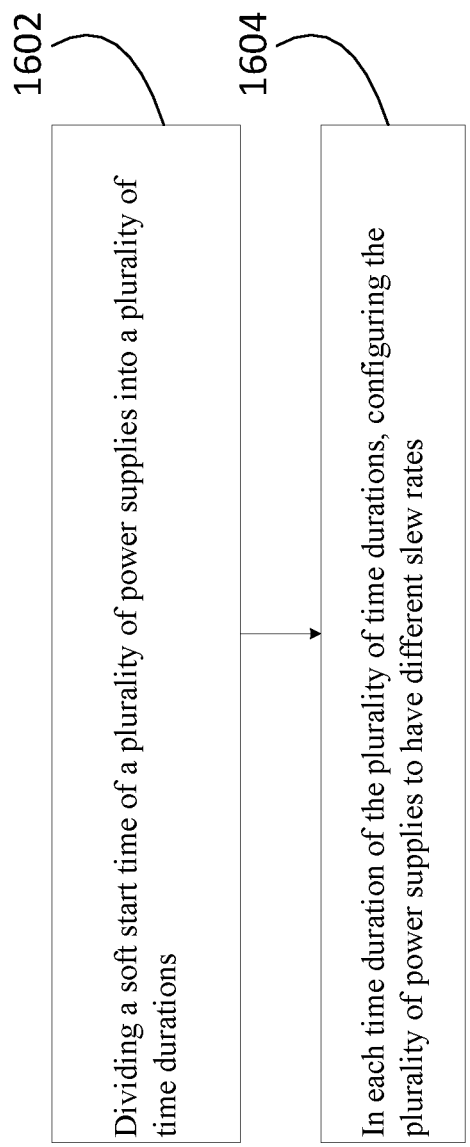
FIG. 16 illustrates a flow chart of another method for controlling the soft start processes of the power supplies shown in FIG. 1 in accordance with various embodiments of the present disclosure.

FIG. 16 illustrates a flow chart of another method for controlling the soft start processes of the power supplies shown in FIG. 1 in accordance with various embodiments of the present disclosure. This flowchart shown in FIG. 16 is merely an example, which should not unduly limit the scope of the claims. One of ordinary skill in the art would recognize many variations, alternatives, and modifications. For example, various steps illustrated in FIG. 16 may be added, removed, replaced, rearranged and repeated.

Referring back to FIG. 1, the plurality of power supplies 101, 102 and 103 is coupled to a same voltage bus. In order to reduce the surge current flowing through the voltage bus, in each phase of the startup process, the slew rates of the output voltages of the plurality of power supplies 101, 102 and 103 are different. The different slew rates help to reduce the surge current flowing through the voltage bus.

At step 1602, a soft start time of the plurality of power supplies is divided into a plurality of time durations.

At step 1604, in each time duration of the plurality of time durations, the plurality of power supplies is configured to have different slew rates.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   configuring a plurality of power supplies to provide power to respective loads coupled to the plurality of power supplies, wherein inputs of the plurality of power supplies are coupled to an input voltage bus, and each of the plurality of power supplies comprises an LLC resonant power converter having a predetermined resonant frequency determined by a resonant tank of the LLC resonant power converter; and
   during a startup process, coordinating the plurality of power supplies such that the plurality of power supplies is powered up in a controllable manner, wherein coordinating the plurality of power supplies comprises generating a plurality of different switching frequency transition times for the plurality of power supplies, and configuring each of the plurality of power supplies to change a switching frequency from an initial frequency setpoint to the predetermined resonant frequency in a corresponding switching frequency transition time, and wherein as a result of coordinating the plurality of power supplies, a surge current flowing through the input voltage bus is reduced.

2. The method of claim 1, wherein:
   the loads are a plurality of crypto mining machines.

3. The method of claim 1, further comprising:
   prior to the startup process, generating a plurality of random numbers; and
   generating a plurality of startup time instants based on the plurality of random numbers, wherein each of the plurality of startup time instants is used to determine a turn-on time instant of a corresponding power supply.

4. The method of claim 3, wherein:
   each power supply comprises a startup control program configured to generate a random number, and wherein startup control programs of the plurality of power supplies are configured to generate the plurality of random numbers.

5. The method of claim 1, further comprising:
   prior to the startup process, generating, by a system controller, a plurality of startup instructions; and
   sending the plurality of startup instructions to respective communication ports of the plurality of power supplies, wherein each of the plurality of startup instruction is used to determine a turn-on time instant of a corresponding power supply.

6. The method of claim 1, further comprising:
   prior to the startup process, the plurality of power supplies communicates to each other to schedule a startup sequence.

7. The method of claim 1, wherein:
   the initial frequency is at least ten times greater than the predetermined resonant frequency.

8. The method of claim 1, further comprising:
   generating a plurality of different soft start times for the plurality of power supplies; and
   configuring each of the plurality of power supplies to establish an output voltage in a corresponding soft start time.

9. The method of claim 1, further comprising:
   dividing a soft start time of the plurality of power supplies into a plurality of time durations; and
   in each time duration of the plurality of time durations, configuring the plurality of power supplies to have different slew rates.

10. A system comprising:
    a plurality of power supplies coupled between a power source and a plurality of loads, wherein each of the plurality of power supplies is configured to provide power to a corresponding load, and each of the plurality of power supplies comprises an LLC resonant power converter having a predetermined resonant frequency determined by a resonant tank of the LLC resonant power converter; and
    a system control apparatus configured to coordinate the plurality of power supplies during a startup process such that the plurality of power supplies is powered up in a sequential manner, wherein coordinating the plurality of power supplies comprises generating a plurality of different switching frequency transition times for the plurality of power supplies, and configuring each of the plurality of power supplies to change a switching frequency from an initial frequency setpoint to the predetermined resonant frequency in a corresponding switching frequency transition time.

11. The system of claim 10, wherein:
    the system control apparatus comprises a plurality of startup control programs, and wherein each startup control program is located at a corresponding power supply, and wherein:
    the plurality of startup control programs is configured to generate a plurality of random numbers; and
    a plurality of startup time instants is generated based on the plurality of random numbers, and wherein each of the plurality of startup time instants is used to determine a turn-on time instant of a corresponding power supply.

12. The system of claim 10, wherein:
    the system control apparatus is configured to generate a plurality of startup instructions, and wherein the plurality of startup instructions is sent to respective communication ports of the plurality of power supplies, and wherein each of the plurality of startup instruction is used to determine a turn-on time instant of a corresponding power supply.

13. The system of claim 10, wherein:
    the system control apparatus comprises a plurality of communication channels, each of the plurality of communication channels being coupled between two power supplies, and wherein through the plurality of communication channels, the plurality of power supplies communicates to each other to schedule a startup sequence.

* * * * *